R. D. JAMESSON.
SPADING MACHINE.
APPLICATION FILED JULY 12, 1915.
1,182,568.  Patented May 9, 1916.
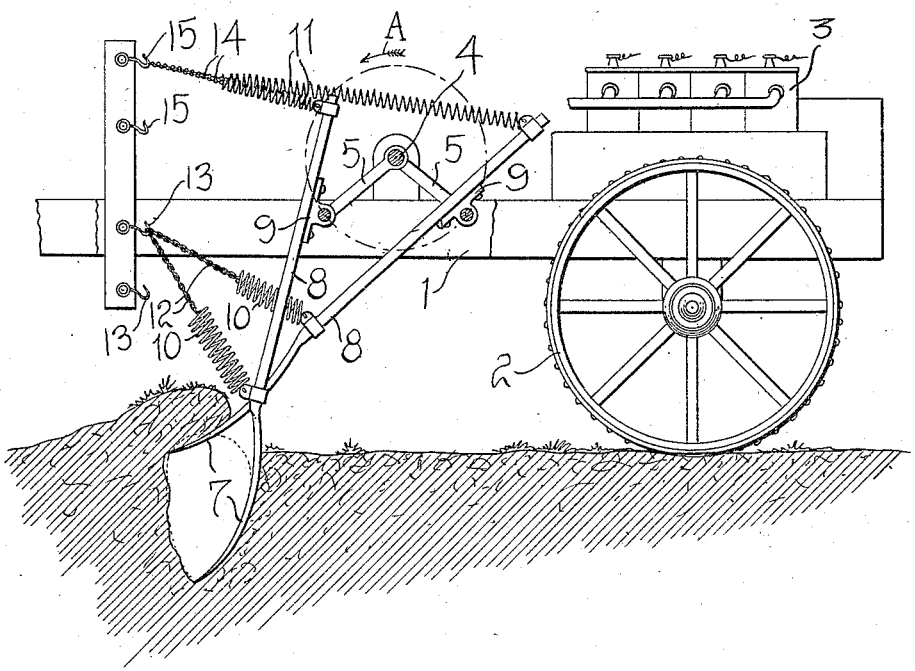
Inventor
R. D. JAMESSON
By Watson E. Coleman
Attorney

UNITED STATES PATENT OFFICE.

RAYNOLD D. JAMESSON, OF PORT ALLEGANY, PENNSYLVANIA.

SPADING-MACHINE.

1,182,568.

Specification of Letters Patent.

Patented May 9, 1916.

Application filed July 12, 1915. Serial No. 39,431.

*To all whom it may concern:*

Be it known that I, RAYNOLD D. JAMESSON, a subject of the King of Greece, residing at Port Allegany, in the county of McKean and State of Pennsylvania, have invented certain new and useful Improvements in Spading-Machines, of which the following is a specification, reference being had to the accompanying drawings.

This invention relates to an improved spading machine and has for its primary object to produce a very simply constructed and light-weight, power-operated spading mechanism whereby the ground may be thoroughly spaded or broken up.

The invention has for another important object to provide a machine of the above character embodying a plurality of spading tools which are individually yieldable when they encounter obstructions, and means whereby the angle of the tools, as they enter the ground, may be varied at will.

With the above and other objects in view, my invention consists in the novel features of construction, combination and arrangement of parts to be hereinafter more fully described, claimed and illustrated in the accompanying drawing, in which I have shown a longitudinal section of a portion of the machine, illustrating the mounting and manner of operation of the spading tools.

The machine, in its simplest embodiment, includes a frame 1 supported at its forward end by the ground wheels 2 which are driven by a suitable motor 3 mounted upon the frame between said wheels. The rear end of the machine is supported by the usual swiveled wheel, not shown. In the machine frame, a crank shaft 4 is rotatably mounted, said shaft being provided with a plurality of angularly disposed crank arms 5. The shaft 4 is rotated from right to left or in a reverse direction to the movement of the machine, as indicated by the arrow at A.

7 designates the spading tools, each of which is provided with a handle bar or shank 8. These shanks carry the studs or gudgeons 9 which are rotatably mounted upon the outer ends of the respective crank arms 5. The spades 7 are yieldingly held in their normal positions by the lower main springs 10 and the upper counterbalancing or cushioning springs 11. The rear ends of the lower springs 10 have chains or other flexible elements 12 connected thereto, which are adapted to be adjustably engaged upon the spaced hooks 13. Flexible elements 14 are similarly connected to the rear ends of the upper springs 11 for adjustable engagement upon a second pair of spaced hooks 15. These hooks 13 and 15 are fixed in a suitable casting mounted in the machine frame. It will be observed that the springs 11 are connected to the respective bars or shanks 8 of the spades above their pivotal axes 9, while the lower main springs 10 are connected to said spades below the axes thereof. By arranging the hooks 13 and 15 at different heights so that the rear ends of the springs can be adjustably connected thereto, it will be obvious that the normal angle of the spades with respect to the machine frame can be varied at will so that said spades will attack the soil at the proper angle in accordance with the particular character of the ground and the work to be performed.

In the operation of the machine, after the motor has been started, rotation is transmitted to the shaft 4 in the direction indicated by the arrow, and the pivots 9 of the tool shanks are carried through a circular path, as indicated in dotted lines. The point of the spading tool will move through a substantially oval-shaped path, as also shown in dotted lines in the drawing. The spading tools are held at the proper angle by means of the lower springs 10 so that they will enter the ground at the desired inclination in the downward movement of the crank arms 5. The counterbalancing or cushioning springs 11 will permit the blades to yield forwardly or rearwardly, should they strike an obstruction. If the blades should strike a rock below the ground surface in their downward movement, owing to the very light weight of the machine the same would be lifted.

The machine may be used in connection with harrows, ditch openers, sweeps, light plows, etc., to give the ground the final preparation while it is being spaded. It is, of course, obvious that any number of the spading tools may be employed. This will be determined largely by the width of the machine.

Having thus fully described my invention, what I desire to claim and secure by Letters Patent is:—

A spading machine including a wheeled supported frame, a shaft journaled therein, means mounted in the frame to rotate said shaft, a plurality of crank arms fixed on said shaft, a plurality of spading tools each having a shank pivotally mounted upon the respective crank arms, two spaced series of hooks on the machine frame, main springs connected to the shanks of the spading tools below their pivots and adapted to be adjustably engaged with the hooks of one series, counterbalancing springs connected to said shanks above their pivots and adapted to be adjustably engaged at their rear ends with the other series of hooks, the adjustment of said springs, in connection with the two series of hooks, varying the normal angle of the spading tools and determining the inclination of the same when they enter the soil, said counterbalancing springs permitting the spading tools to yield forwardly or rearwardly upon encountering obstacles in their path of movement.

In testimony whereof I hereunto affix my signature in the presence of two witnesses.

RAYNOLD D. JAMESSON.

Witnesses:
C. W. CATLIN,
CHAS. JAMESSON.

Copies of this patent may be obtained for five cents each, by addressing the "Commissioner of Patents, Washington, D. C."